United States Patent
Chowdhury

(10) Patent No.: US 12,544,187 B2
(45) Date of Patent: Feb. 10, 2026

(54) BUTTERFLY-SHAPED DENTAL MATRIX BAND

(71) Applicant: Poonam Chowdhury, Edmonton (CA)

(72) Inventor: Poonam Chowdhury, Edmonton (CA)

( * ) Notice: Subject to any disclaimer, the term of this patent is extended or adjusted under 35 U.S.C. 154(b) by 240 days.

(21) Appl. No.: 17/844,095

(22) Filed: Jun. 20, 2022

(65) Prior Publication Data

US 2023/0404706 A1    Dec. 21, 2023

(51) Int. Cl.
*A61C 5/85* (2017.01)
*A61C 5/88* (2017.01)

(52) U.S. Cl.
CPC . *A61C 5/85* (2017.02); *A61C 5/88* (2017.02)

(58) Field of Classification Search
CPC .................................. A61C 5/85; A61C 5/88
See application file for complete search history.

(56) References Cited

U.S. PATENT DOCUMENTS

| | | | | |
|---|---|---|---|---|
| 5,505,618 A * | 4/1996 | Summer | ................... | A61C 5/85 433/148 |
| 5,622,496 A * | 4/1997 | Champagne | ............. | A61C 5/85 433/155 |
| 5,626,476 A * | 5/1997 | Champagne | ............. | A61C 5/85 433/226 |
| 5,730,592 A * | 3/1998 | Meyer | ...................... | A61C 5/85 433/39 |
| 6,142,778 A * | 11/2000 | Summer | ................... | A61C 5/85 433/39 |
| 6,425,760 B1 * | 7/2002 | Summer | ................... | A61C 5/85 433/39 |
| 6,736,639 B1 * | 5/2004 | Summer | ................... | A61C 5/85 433/39 |
| 7,083,412 B1 | 8/2006 | Karapetyan | | |
| 8,834,160 B1 * | 9/2014 | Gottlieb | ................... | A61C 5/88 433/149 |
| 9,358,080 B2 | 6/2016 | Clark | | |
| 10,080,626 B1 * | 9/2018 | Alsulaimani | ............ | A61C 5/88 |
| 2006/0019217 A1 * | 1/2006 | Yates | ....................... | A61C 5/85 433/155 |

(Continued)

FOREIGN PATENT DOCUMENTS

| | | |
|---|---|---|
| CA | 2929517 A1 | 6/2015 |
| DE | 1056323 B | 4/1959 |

(Continued)

*Primary Examiner* — Eric J Rosen
*Assistant Examiner* — Hao D Mai
(74) *Attorney, Agent, or Firm* — Orin Del Vecchio

(57) ABSTRACT

Described are various embodiments of a butterfly-shaped dental matrix band for performing fillings on two adjacent teeth simultaneously. In one embodiment, the band comprises a central portion, the central portion resting at the contact point upon the band being engaged in-between the adjacent teeth; two thin and pliable adjacent wings, each wing surrounding and extending away circumferentially from an edge of the central portion, and wherein a first portion of each wing comprising an area extending from said central portion to a lower edge of each wing along said vertical axis has a thickness equal to at most half the thickness of the central portion; and a second portion of each wing not included in said first portion has a thickness equal to the thickness of the central portion. In some embodiments, each wing has a tab at the upper edge thereof to grab and manipulate the matrix band.

14 Claims, 5 Drawing Sheets

(56) References Cited

U.S. PATENT DOCUMENTS

| | | | |
|---|---|---|---|
| 2008/0064012 A1* | 3/2008 | Clark | A61C 5/85 |
| | | | 433/226 |
| 2008/0176179 A1 | 7/2008 | Coffee | |
| 2009/0142725 A1 | 6/2009 | Bryant et al. | |
| 2015/0150651 A1* | 6/2015 | Mcdonald | A61C 5/85 |
| | | | 433/149 |
| 2018/0014913 A1 | 1/2018 | Fatiny | |
| 2019/0350679 A1* | 11/2019 | Thai | A61C 5/85 |
| 2021/0322135 A1 | 10/2021 | Thai | |

FOREIGN PATENT DOCUMENTS

| | | |
|---|---|---|
| DE | 102017012133 A1 | 8/2020 |
| WO | 2006056989 A1 | 6/2006 |

* cited by examiner

BUTTERFLY-SHAPED DENTAL MATRIX BAND

FIELD OF INVENTION

The present disclosure relates to matrix filling bands, and more particularly, to a butterfly-shaped matrix band.

BACKGROUND

Dental restoration, dental fillings, or simply fillings are treatments used to restore the function, integrity, and morphology of missing tooth structure resulting from cavities. These procedures typically require packed filling material to be retained in position in a tooth preparation for a time. A dental matrix band, also known as a band or as a matrix, may be placed against the side of the tooth to maintain the filling material in place, and to prevent it from flowing outside of the required tooth boundary, which could otherwise distort the configuration of the restored tooth. The filling material typically comprises an amalgam or a tooth colored filling material, which may be chemically and/or optically curable, for example. A matrix band typically comprises a thin flexible strip made of metal, plastic or other suitable material that can be wrapped around the contour of the tooth being restored. Thus, a matrix band acts as a template to facilitate reestablishment of lost tooth contour by the filling material.

However, in some cases patients may have two adjacent teeth that may each require fillings to be performed simultaneously. Typically, this can be done by performing the filings one at a time, by first sliding in a first band, shaping the band and doing the filling, removing the first band then sliding in a second band, shaping it and doing the second filling. However, this is very time consuming. Another way is to put two bands at the same time before doing the filings. However, the result is highly dependent on the dentist's hand skills to be able to recreate the shapes of the teeth after the filings are placed, and the increased thickness caused by the two bands being present at the contact point in the interproximal space can cause an open contact, which is problematic, for example by allowing food to pass which causes food impaction or other problems. The related art below describes many types of known matrix bands.

U.S. Pub. No. 2008/0176179A1 (Coffee) discloses a dental apparatus. In one example, the dental apparatus includes two dental band members operably connected together at a predetermined location thereon for placement between two adjacent teeth of a patient. Such two dental band members are manufactured from a first predetermined material and have a first predetermined size and a first predetermined shape. Such dental apparatus also includes a mechanism for at least one of separating such two adjacent teeth of such patient and engaging such patient's teeth such that each dental band member sits closely adjacent a respective tooth of such patient in a manner conducive to a dentistry procedure including at least restorative dentistry. Shortcomings include a lack a reduced thickness of the wings below the central portion to prevent the wings from obstructing when inserting and removing the band, and a lack of tabs for easily engaging and disengaging the band.

International Patent Application WO 2006/056989 A1 (Jodaikin et al.) discloses a matrix band element. In one example, the matrix band element has spaced first and second surfaces which may be independently urged towards the dental surfaces of two adjacent teeth, such as to provide a template for each tooth. This enables the matrix band element to be used for performing a restoration on two adjacent teeth without removing the band from its place. An integral or separate retainer facilitates placement of the matrix surfaces over the dental areas having the cavities that are to be restored and helps maintain the contour of the respective templates. Shortcomings include a lack of tabs for easily engaging and disengaging the band, a lack of a reduced thickness of the central portion for providing a tight fit between the adjacent teeth, and a lack a reduced thickness of the wings below the central portion to prevent the wings from obstructing when inserting and removing the band.

DE Patent 102017012133A1 (Gleich) discloses a matrix for insertion between a first tooth and a second tooth of a set of teeth. In one example, the matrix comprises a first shaped body which has a first main surface and a second main surface opposite the first main surface. The first main surface in the inserted state of the matrix is in contact with the first tooth, further comprising a second molded body which has a first main surface and a second main surface opposite the first main surface. The first main surface in contact with the second tooth when the die is inserted and the second main surface of the first shaped body and the second main surface of the second shaped body are in mutual contact with one another. Shortcomings include a lack a reduced thickness of the wings below the central portion to prevent the wings from obstructing when inserting and removing the band, and a lack of tabs for easily engaging and disengaging the band.

U.S. Pat. No. 7,083,412 B1 (Karapetyan) discloses an improved dental tooth spacer assembly that provides a safe separation of the restoring tooth and the adjacent tooth during dental procedures. In one example, the improved dental tooth spacer assembly includes a separating portion made of a durable flexible material and comprising a first wall and a second wall. Also the improved dental tooth spacer assembly includes a fixing member comprising an elongated body, a first wing and a second wing. Shortcomings include a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

U.S. Pat. No. 9,358,080 B1 (Clark) discloses a dental separator ring includes an elastic body having a first end and an opposed second end spaced from the first end. The body has three axes defined by a front to rear reference line of the body, a side to side reference line of the body, and a top to bottom reference line of the body. A first surface engager is connected to the first end of the body by a first connector, and a second surface engager is connected to the second end of the body by a second connector. The first connector allows motion of the first surface engager in all three axes, and the second connector allows motion of the second surface engager in all three axes. A third surface engager and a fourth surface engager that allow motion in all three axes may also be included in the separator ring. Shortcomings include a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

CA Patent Application 2,929,517 A1 (Mcdonald) discloses a dental wedge for inserting into the interproximal space between adjacent teeth. In one example, the dental wedge comprises a first and second sidewall comprised of a shape memory material, including a nickel-titanium alloy, wherein the dental wedge is in a first, resting state when outside of the interproximal space and transforms to a second, operational state when the dental wedge is interested into the interproximal space between adjacent teeth and exposed to a first transformation stimulus, namely exposure to the higher temperature in the interproximal space. The expansion force generated by the dental wedge when in the second, operational stage is sufficient to secure a dental matrix against the tooth being restored and to separate the tooth being restored and adjacent tooth to expand the interproximal space. Shortcomings include a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

DE Patent Application 1056323B discloses a matrix tensioner for the simultaneous production of two tooth fillings on two adjacent teeth with a tensioning band which rests against the filling points and which can be tensioned and releasable by means of two tensioning parts which are mutually adjustable by a tensioning screw. Shortcomings include a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

U.S. Patent Pub. No. 2021/0322135A1 (Thai) discloses a matrix band featuring a three-dimensional surface structure that is contoured to an outer portion of a torus to allow the matrix band to securely fit around a tooth. In one example, the matrix band comprises: an outer surface of the matrix band; an upper and lower edge of the matrix band; a proximal and distal end of the matrix band; and a concave ridge disposed along the band. The outer surface of the band forms a first convex curve between the upper edge and the lower edge of the band and a second convex curve between the proximal and the distal end of the band. The concave ridge may extend between the upper edge and the lower edge of the band and between the proximal and distal ends of the band. Shortcomings include a lack of two coupled adjacent pliable wing portions that can each act as a filling retainer, a lack of a reduced thickness of the central portion along the horizontal direction providing a tight fit between the adjacent teeth, a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

U.S. Patent Pub. No. 2018/0014913A1 (Fatiny) discloses a V-shaped plastic dental matrix band. In one example, the dental matrix band has an elongate body with first and second ends, a central portion between the first and second ends, and a collar portion on top of the central portion. The plastic dental matrix band tapers in thickness from thick first and second ends to a thin central portion, thereby providing a snug fit and tight contact with the tooth. The thick first and second ends are adapted to provide a bearing surface for the clamping screws of a matrix band retainer. The thickness of the collar portion is the same as that of the first and second ends and tapers from a top of the collar portion to a shared border with the central portion. Shortcomings include a lack of two coupled adjacent pliable wing portions that can each act as a filling retainer, a lack of a reduced thickness of the central portion along the horizontal direction providing a tight fit between the adjacent teeth, a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

U.S. Patent Pub. No. 2009/0142725A1 (Bryant et al.) discloses a dental matrix band. In one example, the dental matrix band includes a body portion, having a fluoropolymer layer disposed thereon. The fluoropolymer layer reduces undesirable adhesion between dental restorative material and the matrix band. In one embodiment, the fluoropolymer is applied onto the body portion of a stainless steel matrix band in a layer having a thickness in the range of from approximately 0.0005 inches to 0.001 inches. Shortcomings include a lack of two coupled adjacent pliable wing portions that can each act as a filling retainer, a lack of a reduced thickness of the central portion for providing a tight fit between the adjacent teeth, a lack a reduced thickness of the wings below the central portion to prevent the wings from obstructing when inserting and removing the band, and a lack of tabs for easily engaging and disengaging the band.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concepts described herein to provide a basic understanding of some aspects of the disclosure. This summary is not an extensive overview of the disclosure. It is not intended to restrict key or critical elements of embodiments of the disclosure to delineate their scope beyond that which is explicitly or implicitly described by the following description and claims.

A need exists for a butterfly-shaped dental matrix band that overcomes some of the drawbacks of known techniques, or at least, provides a useful alternative thereto. Some aspects of the herein described embodiments provide examples of such devices. In particular, one such aspect provides a butterfly-shaped dental matrix band that comprises two coupled adjacent pliable wing portions extending from a same central portion that can each act as a filling retaining surface and allows to perform filling procedures on adjacent teeth simultaneously, the band having a reduced thickness at the central portion thereof to provide a tight fit between the adjacent teeth and avoid open contacts, the wings having a varying thickness so as to have the reduced thickness below the contact point to easily insert and remove the band without obstruction, and the wings each having a tab on an upper edge thereof for easily manipulating the band.

In accordance with one aspect, there is provided a matrix band for performing fillings on two adjacent teeth simultaneously, the matrix band comprising: a substantially pliable and thin central portion, the central portion resting at the contact point upon the band being engaged in-between the adjacent teeth; two thin and pliable adjacent wings, each wing surrounding and extending away circumferentially from an edge of the central portion, having a length along a horizontal axis and a height along a vertical axis, and being configured to act as a filling retaining surface upon the band being engaged in between the adjacent teeth; and wherein a first portion of each wing comprising an area extending from said central portion to a lower edge of each wing along said vertical axis has a thickness equal to at most half the thickness of the central portion; and a second portion of each wing not included in said first portion has a thickness equal to the thickness of the central portion.

In one embodiment, said first portion further comprises an area extending from said central portion to an upper edge of each wing.

In one embodiment, said central portion and said two adjacent wings are part of a unitary structure.

In one embodiment, the matrix band further comprises: a tab portion extending outwardly from an upper edge of each wing.

In one embodiment, said central portion and each wing are made from a strong and ductile material.

In one embodiment, said strong and ductile material is stainless steel.

In one embodiment, the length or height of one wing of said two adjacent wings is different than the length or height of the other wing of said two adjacent wings.

In one embodiment, the height of at least one wing of said two adjacent wings is between 4 mm and 8 mm.

In one embodiment, the two adjacent wings are pre-curved.

In one embodiment, the two adjacent wings are pre-curved in a configuration wherein each wing is oppositely concavely curved so that an edge of one wing of said two adjacent wings is moved away from a corresponding edge of the other wing of said two adjacent wings.

In one embodiment, each wing of said two adjacent wings is curved according to a different curvature profile.

In one embodiment, said different curvature profile is based on a type of tooth.

In one embodiment, the thickness of the central portion is at most equal to 0.0015 inches.

In one embodiment, a relative placement of said central portion on each wing of said two adjacent wings is different.

Other aspects, features and/or advantages will become apparent upon reading of the following non-restrictive description of specific embodiments thereof, given by way of example only with reference to the accompanying drawings.

BRIEF DESCRIPTION OF THE DRAWINGS

To easily identify the discussion of any particular element or act, the most significant digit or digits in a reference number refer to the figure number in which that element is first introduced.

Figure 1:
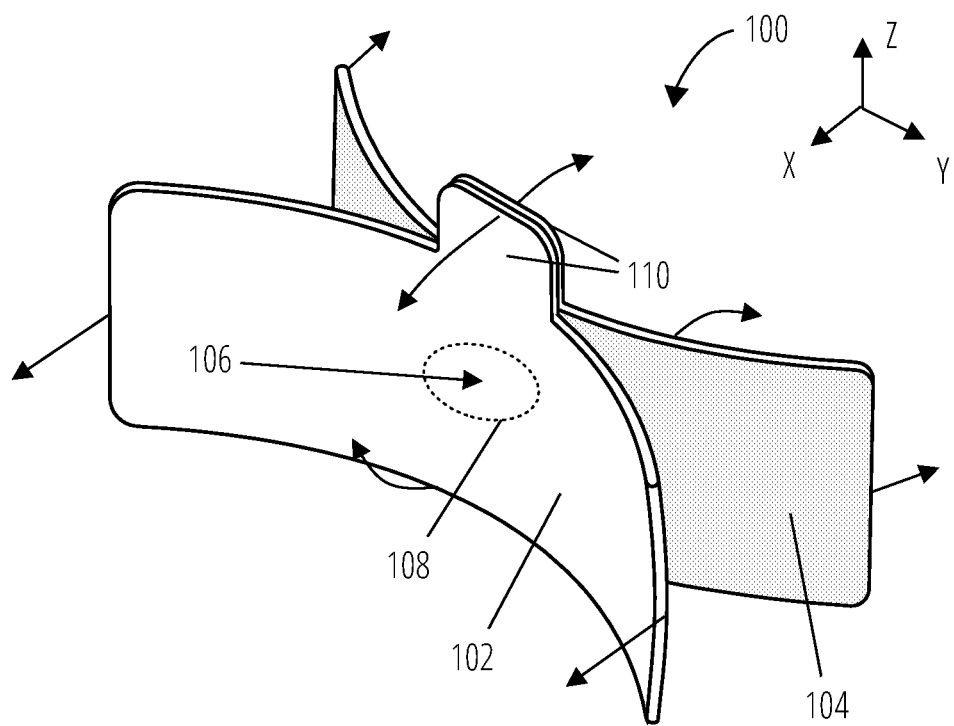
FIG. 1 is a perspective view of a butterfly-shaped matrix band, in accordance with one embodiment.

Elements in the several drawings are illustrated for simplicity and clarity and have not necessarily been drawn to scale. For example, the dimensions of some of the elements. In the drawings may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

The tool and methods described herein provide, in accordance with different embodiments, different examples of a "butterfly-shaped" matrix band which can be used to perform fillings on two adjacent teeth simultaneously using a single band. The band, in accordance with different embodiments, comprises two wings or wing portions extending circumferentially from a same thin central portion, each wing portion operable to act as a wall or barrier for one tooth once the band is inserted between the teeth to provide the appropriate filling retaining surface in which to enable the restoration procedures simultaneously on the adjacent teeth. The use of a same central portion allows for a reduced thickness at the contact point when the band is inserted between the teeth. In addition, each wing has a variable thickness so that a portion thereof located below the central portion of the band has a reduced thickness equal to at most half the thickness of the central portion. This avoids that the wings, once collapsed on one another, have a combined thickness that is larger than the thickness of the central portion, as this would create an obstacle or obstruction to the insertion or removal of the band. In addition, in some embodiments, the upper edges of the wings of the butterfly-shaped band further comprises tabs thereon for more easily grabbing the band and engaging it into or disengaging it from the interproximal region between the adjacent teeth. By using this butterfly-shaped band, simultaneous filling procedures on two adjacent teeth can be completed in a more efficient and consistent manner, while ensuring that creating an open contact is avoided.

FIG. 1 is a perspective view of the dual-use matrix band 100, in accordance with one embodiment. The matrix band 100 comprises two adjacent thin and pliable sheet-like wings or wing portions 102 and 104 coupled together via a central portion 106, the exemplary location of which is delineated by the dotted circle 108. In this example, the two adjacent thin and foldable wings or wing portions 102 and 104 each comprises on an upper edge thereof a tab or tab portion 110 which is used to grab and manipulate the matrix band 100. Each wing 102 and 104 extends circumferentially away from the central portion 106 along the outer edge 108 thereof.

Each of wings 102 and 104, and the single-layer central portion 106, are made of a single sheet of a thin and strong but pliable ductile material. In one preferred embodiment and as will be discussed further below, the wings are provided pre-curved (as illustrated in FIG. 5B for example) but are illustrated in FIGS. 1 to 4 with different curvature shapes only so as to better illustrate specific features thereof. In addition, in the preferred embodiment, each of the central portion 106 and wings 102 and 104 are part of a single one-piece unitary structure. However, other embodiments may include having the wings 102 and 104 configured to be separately manufactured and joined or fused together to form the central portion 106. The material should be easily deformable or ductile upon a force or pressure being applied to it, but operable to retain its shape upon the force or pressure removed. Ideally, this material should also be substantially non-reactive and impervious to fluids. Finally, the material should be strong enough so as not break or tear apart upon the band being slidingly engaged or disengaged. An well-known example includes stainless steel or the like. However other materials, including different metals and/or alloys known in the art may be used as well. This may also include materials coated with one or more chemicals or layers, without limitation. In FIG. 1, the wings 102 and 104 are shown to be partially folded in the XY plane as an example only. Generally, the wings 102 and 104 can each be folded or molded in any direction or manner (some examples of which as shown by the arrows) to better conform to the shape of the teeth once the device is fitted there between.

In some embodiments, the tabs 110 may be made of the same material as the wings 102 and 104. This may include manufacturing the tabs 110 as a protrusion of the wings 102 and 104. Other embodiments may have each tab affixed or fused with the upper edge of the wings 102 and 104. In some embodiments, the tabs 110 may be made of a different material than the wings 102 and 104 or central portion 106. This may include for example metals and/or plastics. While the tabs 110 are illustrated as being substantially rectangular and comprising rounded upper corners, the skilled person in the art will appreciate that different shapes and sizes may be used as well, without limitation. Typically, the tabs 110 should be easy to grab and hold for example with forceps or cotton pliers when the matrix band 100 is inserted or removed from between interproximal space between the adjacent teeth.

Figure 2:
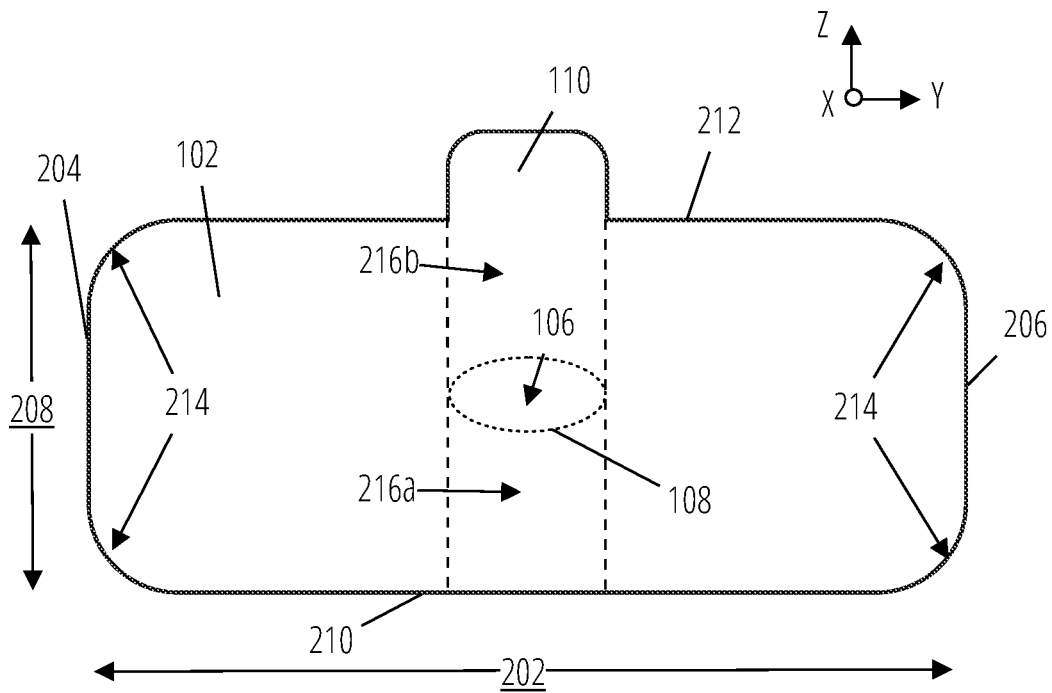
FIG. 2 is a front view of the butterfly-shaped matrix band, in accordance with one embodiment.

FIG. 2 is a front view of the butterfly-shaped matrix band 100, in accordance with one embodiment. As in FIG. 1, the central portion 106 of the band 100 is shown delineated by the dotted circle. In this embodiment, each thin and malleable or pliable wing (here wing 102 for example), extends circumferentially away from the edge 108 of the central portion 106, along a horizontal length 202 (from side edge 204 to 206) and a vertical height 208 (from a bottom edge 210 to a top edge 212). Typically, the vertical height 208 should be large enough so as to encompass the height of a tooth. For example, values between 4 and 6 mm may be used, but other values may be used as well, without limitation. In some embodiments, larger heights may be provided for deeper fillings. For example, the 4 mm band may comprise an extension to 6 mm or 7 mm, while the 6 mm band may comprise an extension to 8 mm. The length 202 should be large enough so as to be able to wrap around each wing horizontally around the region that requires the filling. In addition, in some embodiments, the wings (102 or 104) may comprise rounded corners 214 as illustrated in FIG. 2.

In the preferred embodiment, the wings 102 and 104 have a varying thickness that tapers to a reduced thickness in a portion 216a (delineated by the two vertical dashed lines) comprising an area located below the central portion 106. The reduced thickness of the wings in the portion 216a below the central portion 106 allows to avoid the wings from obstructing when inserting or removing the matrix band 100 from the adjacent teeth. In some embodiments, shown for example in FIGS. 3 and 4, the portion 216b of the wings located above the central portion 106 (also delineated by the two vertical dashed lines) may also have a reduced thickness. While in this examples, both the portions 216a and 216b of each wing are shown to be located inside the area delineated by the two vertical dashed lines, the exact shape of these portions may be different from the one illustrated in FIG. 2, as long as the portion 216a extends vertically all the way from the central portion 106 to the bottom edge of the wings so that the wings do not obstruct or provide resistance to insertion or removal of the band.

Figure 3:
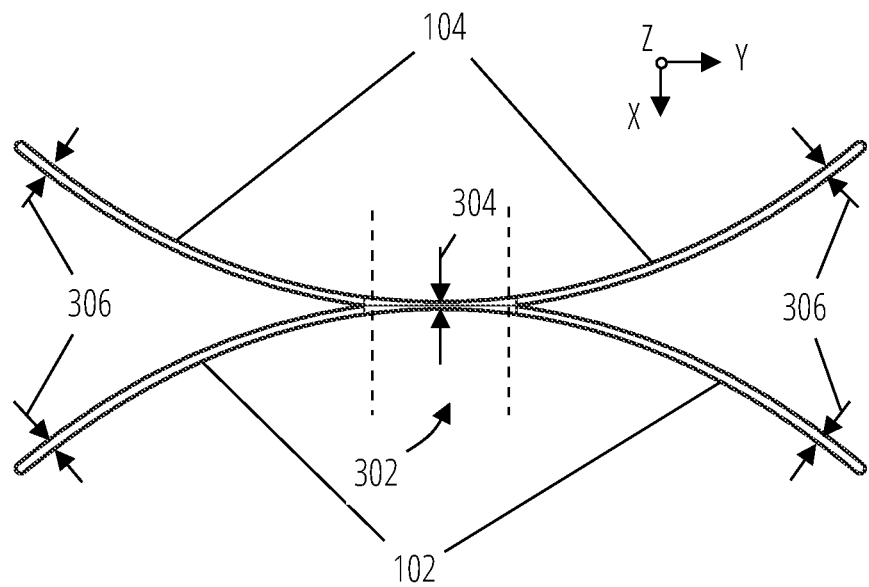
FIG. 3 is a top view of the butterfly-shaped matrix band, is a in accordance with one embodiment.

FIG. 3 is a top view of the matrix band 100, in accordance with the same exemplary embodiment where portion 302 (comprising both the portions 216a and 216b shown in FIG. 2) of each wing has a reduced thickness. From this view, which shows the wings 102 and 104 curving only in the horizontal plane only to better view their relative thickness along the y direction, it can be clearly seen that the portion 302 located between the two dashed lines has a same overall thickness 304 that is equal to a thickness 306 of a single wing outside that area. Thus, each wing 102 or 104 has a larger thickness outside of the portion 302 and tapers or changes to a reduced thickness within it. The central portion 106 itself has a thickness 304. Thus, the matrix band 100 described herein has a reduced thickness 304 at the contact point, which preserves the tight fit and avoids an open contact situation. In addition, the wings are also thinner below (and also optionally above) the central portion 106 so that, when pressed one against the other, they have a combined overall thickness equal to thickness 304 to prevent the wings from obstructing when inserting or removing the band. In different embodiments, the exact width of the portions 216a and 216b comprising portion 302 along the y direction may be different from the one illustrated, as long as it includes the central portion 106.

Figure 4:
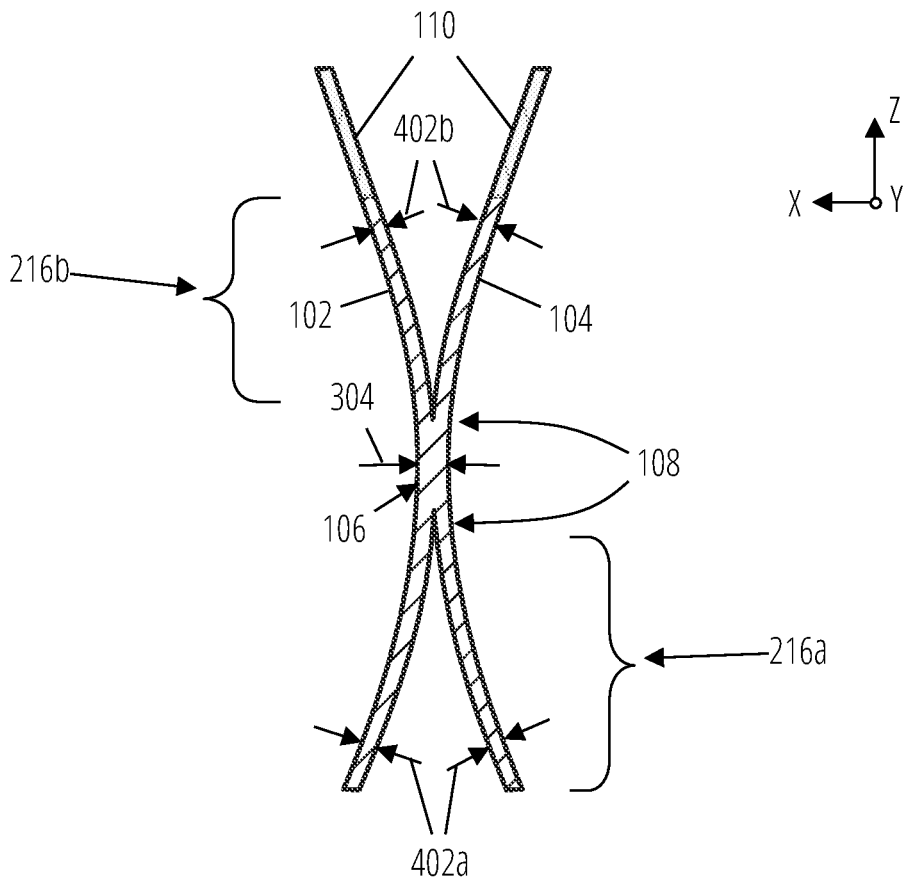
FIG. 4 is a side sectional view of the butterfly-shaped matrix band, in accordance with one embodiment.

FIG. 4 is a sectional view showing a vertical cross-section of the matrix band 100 corresponding to the central location of the arrows 304 in FIG. 3. From this view, the central portion 106 coupling the wings wing 102 and 104 is clearly visible. In addition, the wings 102 and 104 are partially folded within the XZ plane only to better differentiate the different thickness ratios from this perspective. As mentioned above, the wings 102 and 104 each have a reduced thickness in the portion 216a below the central portion 106 to avoid the wings from obstructing when inserting or removing the band. It can be seen that to maintain a constant same thickness 304 along the vertical (z) direction, the thickness 402a of each wing 102 and 104 below the central portion 106 is equal to at most half of the thickness 304 of the central portion 106 (here exactly half in FIG. 4).

Optionally, in some embodiments, for example as shown in the illustrated embodiments of FIGS. 3 and 4, the portion 216b or each wing 102 and 104 located above the central portion 106 may also have a reduced thickness 402b. To maintain a constant overall vertical thickness 304 in this region (e.g., both in the central portion 106 and in the portions 216a and 216b), the thickness 402a and 402b of each wing 102 and 104 the central portion 106 (along the z direction) is equal to at most half of the thickness 304 of the central portion 106 (exactly half in FIG. 4 as an example only). Thus, when the wings are joined together (for example as illustrated in FIG. 1) there is a constant thickness 304 along the z direction from the bottom to the top. This avoids having the wings 102 and 104 creating an obstruction, for example the portion 216a below the central portion 106, by having a joined total thickness larger than the thickness 304 of the central portion 106. This is in contrast with other dual bands known in the art having a reduced thickness only at the contact point, but not below. In contrast, having a thinner portion 216a that includes a portion of the wings above and below the central portion 106 allows the matrix band 100 to be easily inserted and removed from in-between the adjacent teeth because the reduced thickness 402a of the portion 216a will be constant along that direction. As an example, in some embodiments, the value of thickness 304 of the central portion 106 may be of the order of 0.0015" or the like, so that the thickness 402a of each wing below the central portion 106 may be at most half that value.

Figure 5A:
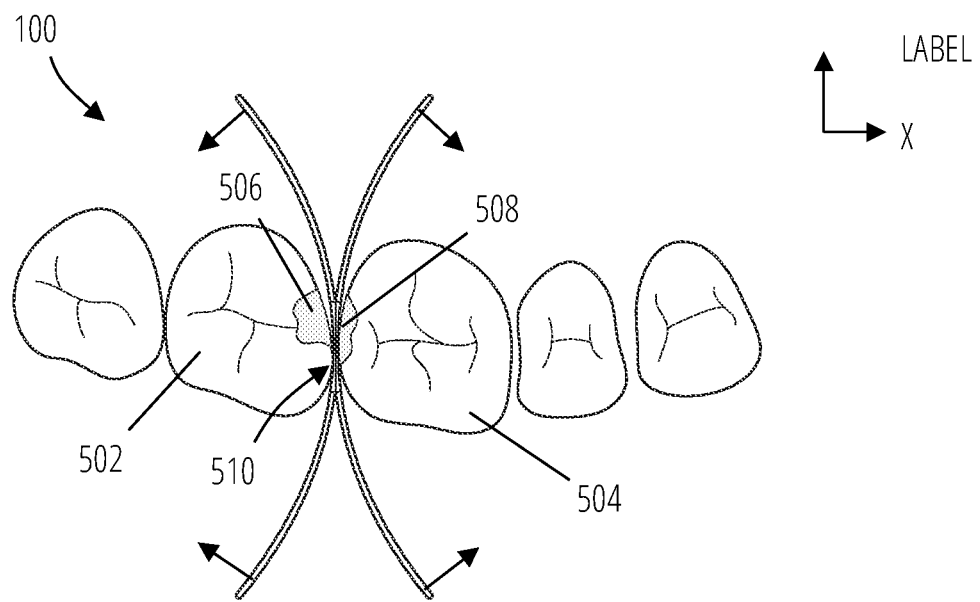
FIGS. 5A and 5B are a top and top perspective view, respectively, of the butterfly-shaped matrix band engaged in the interproximal space between two adjacent teeth, in accordance with one embodiment.
Figure 5B:
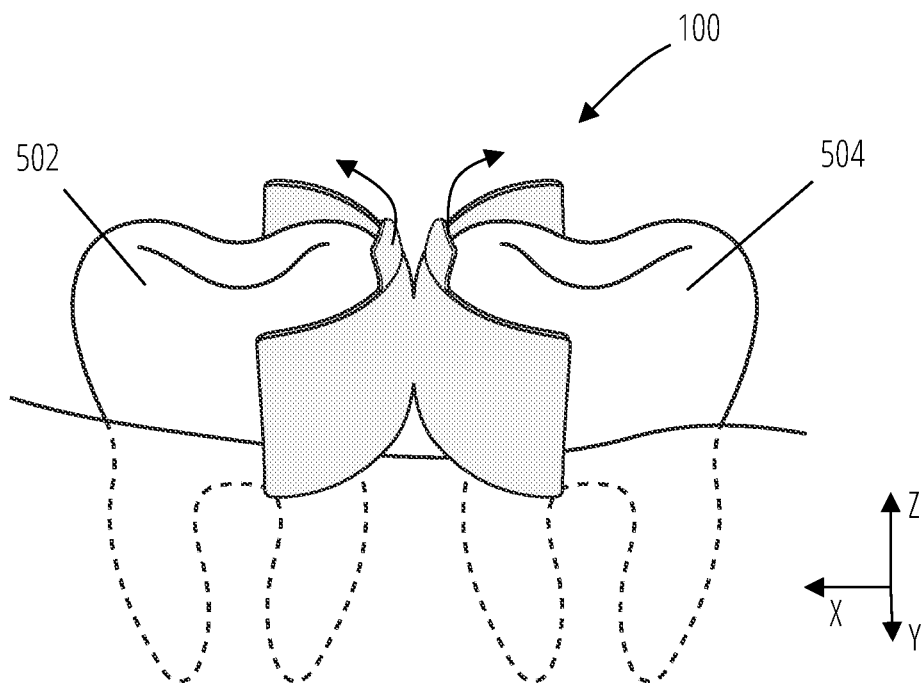

FIGS. 5A and 5B are a top view and a top perspective view, respectively, of the matrix band 100 after being slidingly inserted in-between two adjacent teeth 502 and 504. The teeth 502 and 504 are shown having cavities 506 and 508 respectively, and the matrix band 100 can be used advantageously to fill both cavities at the same time. The matrix band 100 is slidingly engaged or inserted by grabbing the tabs 110 and pushing it in a downwards fashion until it rests in the interproximal region 510. Once inserted, the wings 102 and 104 can be deformed or folded to substantially conform to the tridimensional contour of the contacting surface of each tooth 502 and 504.

In addition, FIG. 5B shows an exemplary preferred embodiment in which the matrix band 100 has a pre-curved configuration. In this pre-curved configuration, each wing 102 and 104 is oppositely concavely curved or rounded as illustrated in FIG. 5B so that the edges of one wing extend away from the corresponding edges of the other wing. In some embodiments, the bands 100 may come with different curvature profiles (i.e., the curvature may be stronger or smaller). In some embodiments, one wing may have a different curvature profile than the other wing. In some embodiments, the curvature profile may be adapted to a specific type of tooth surface, or cavity location.

Figure 6A:
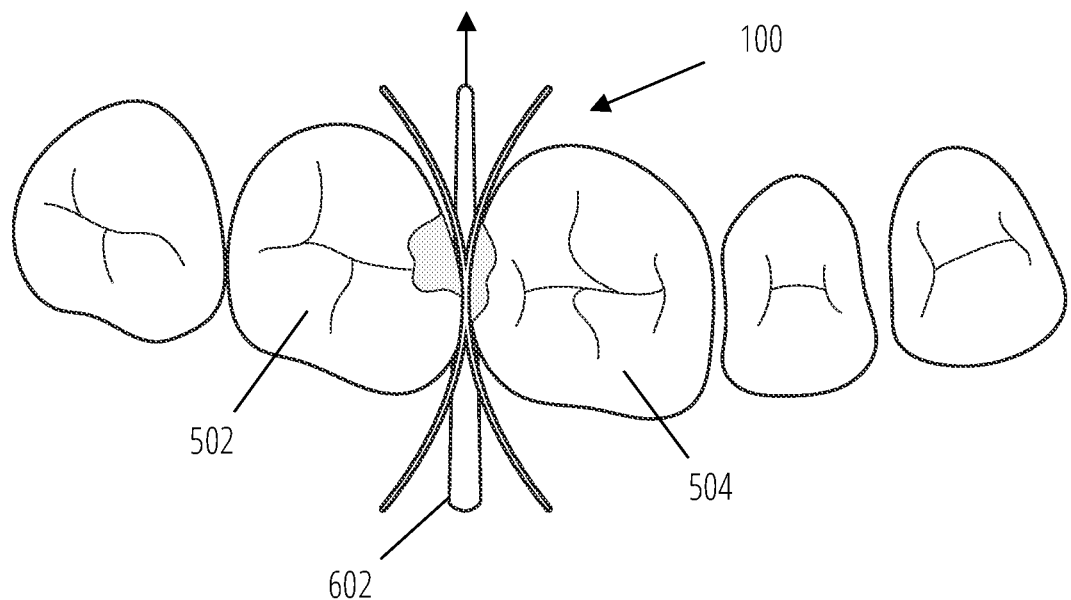
FIGS. 6A and 6B are top views of a wedge (FIG. 6A) and a spring-loaded ring (FIG. 6B) used to shape and secure the butterfly-shaped matrix band, in accordance with one embodiment.
Figure 6B:
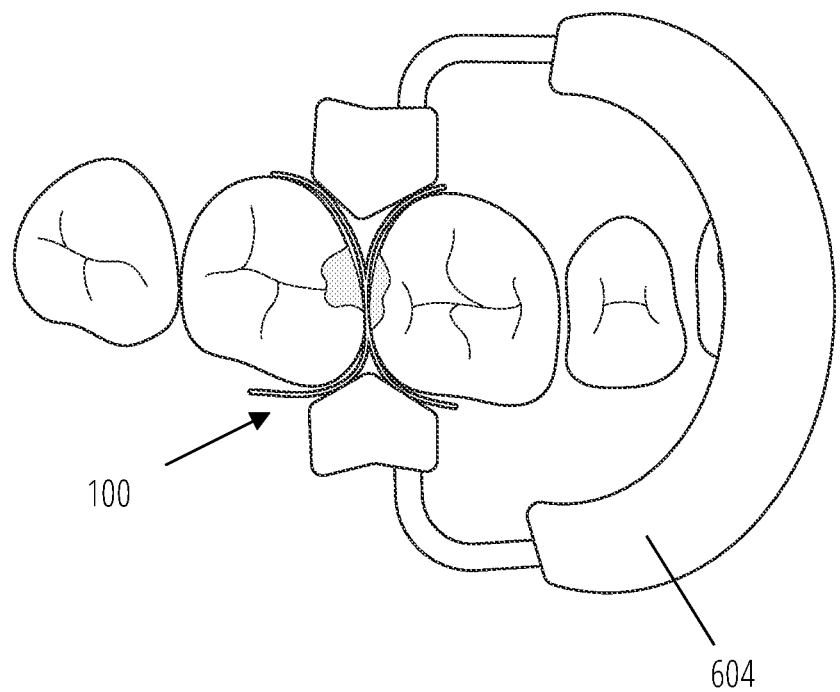

Once inserted, the matrix band 100 can be further adapted to the teeth using a wedge 602 as shown for example in FIG. 6A. The wedge 602 is typically inserted below the contact point and goes through the interproximal spacing as illustrated. Once the wedge 602 has been inserted, the matrix band 100 can be secured or held in place for example via a spring-loaded ring 604, as illustrated in FIG. 6B. The skilled person in the art will appreciate that the wedge 602, and the spring loaded ring 604, illustrated in FIGS. 6A and 6B are examples only. Generally, the matrix band 100 can be used with any type of wedge or ring, or other retaining device known in the art, without limitation.

To remove the matrix band 100 after treatment, the practitioner can pinch or grab both tabs 110 together and gently pull to slidingly disengage the matrix band 100 from the interproximal space. Since the portion 216a has each wing having a thickness 402a equal to half the thickness 304 of the central portion 106, the band 100 can easily slide out upon being pulled since the total thickness of the collapsed wings will be equal to the thickness 304 in the middle central portion 106.

In the above disclosure, each of wings 102 and 104 have a same shape and size as an example only. In some embodiments, each of wings 102 or 104 can have a different shape or size. For example, in some embodiments, one wing may have a smaller or larger height 208 than the other. In addition, in some embodiments, the location of the central portion 106 on a given wing 102 or 104 can be different from the one illustrated in FIGS. 1 to 6. For example, in some embodiments, at least one wing may be joined with the central portion 106 at a relative position that is either higher or lower, or more to the left or to the right than the position illustrated. This allows one wing to have a larger length or height on one side of the central portion 106 compared to the opposite side. These variations in shape, size and central portion placement may be used to account for different cavity placement, or to account for different or differing types of adjacent teeth (e.g., pre-molar, molars, etc.).

Figure 7:
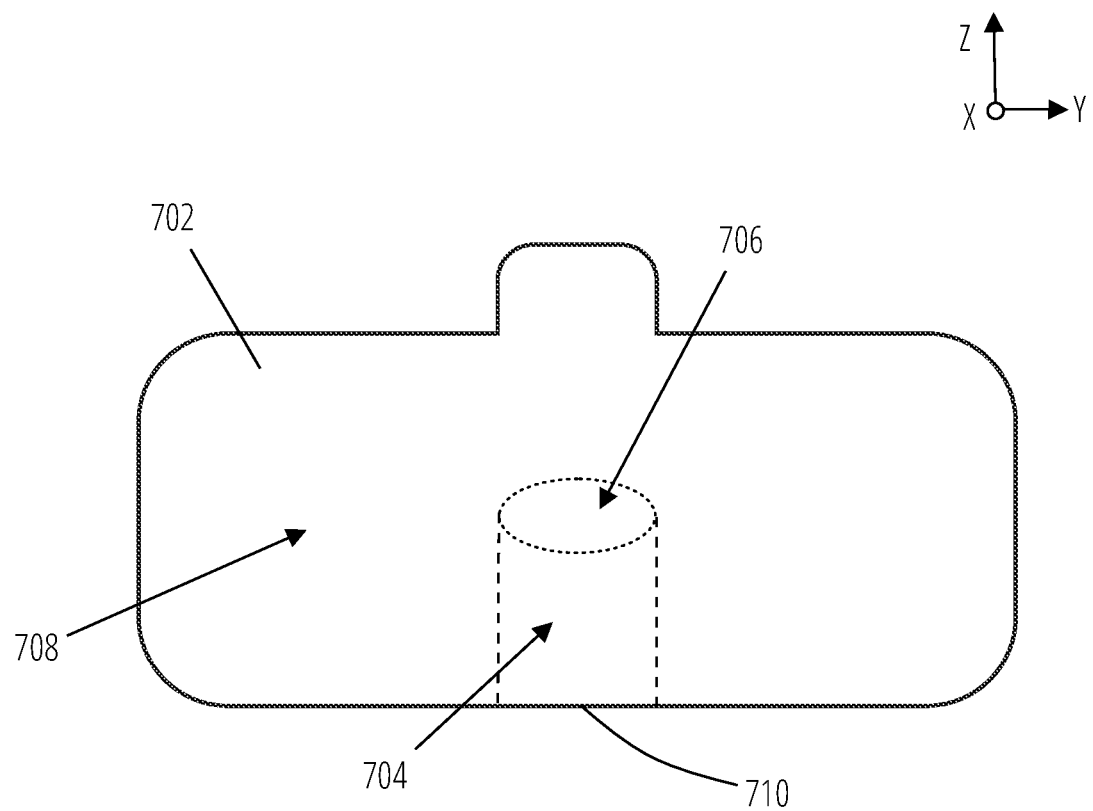
FIG. 7 is a side view of a wing of the butterfly-shaped matrix band, in accordance with one embodiment.

FIG. 7 illustrates schematically, in accordance with one embodiment, a wing 702 having only a portion 704 of the wing below the central portion 706 having a reduced thickness (for example corresponding to the reduced thickness 402a of FIG. 4. The portion 704 is shown extending vertically from the central portion 706 all the way down to the lower edge 710 of the wings 702. The rest of the wing 702 (portion 708) may have a constant thickness equal to the thickness 304 of the central portion 106 (as illustrated in FIG. 4).

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A matrix band for performing fillings on two adjacent teeth simultaneously, the matrix band comprising:
   a substantially pliable and thin central portion, the central portion configured for resting at a contact point between the adjacent teeth upon the band being engaged in-between the adjacent teeth and the central portion having a thickness;
   two thin and pliable adjacent wings, each wing of said two adjacent wings surrounding and extending away circumferentially from an edge of the central portion, said each wing having a length along a horizontal axis and a height along a vertical axis, and being configured to act as a filling retaining surface upon the band being engaged in between the adjacent teeth; and
   a first portion of said each wing comprising an area extending from said central portion to a lower edge of said each wing along said vertical axis and an area extending from said central portion to an upper edge of said each wing along said vertical axis, wherein said area extending from said central portion to the lower edge of said each wing has a thickness equal to half the thickness of the central portion; and
   a second portion of said each wing extending horizontally away from the central portion having a thickness equal to the thickness of the central portion.

2. The matrix band of claim 1, wherein said central portion and said two adjacent wings are part of a unitary structure.

3. The matrix band of claim 1, further comprising:
   a tab portion extending outwardly from the upper edge of said each wing.

4. The matrix band of claim 1, wherein said central portion and said each wing are made from a strong and ductile material.

5. The matrix band of claim 4, wherein said strong and ductile material is stainless steel.

6. The matrix band of claim 1, wherein a length or a height of one wing of said two adjacent wings is different than a length or a height of the other wing of said two adjacent wings.

7. The matrix band of claim 6, wherein the height of at least one wing of said two adjacent wings is between 4 mm and 8 mm.

8. The matrix band of claim 1, wherein the two adjacent wings are pre-curved.

9. The matrix band of claim 8, wherein the two adjacent wings are pre-curved in a configuration wherein said each wing is oppositely concavely curved so that an edge of one wing of said two adjacent wings is moved away from a corresponding edge of the other wing of said two adjacent wings.

10. The matrix band of claim 9, wherein said each wing of said two adjacent wings is curved according to a different curvature profile.

11. The matrix band of claim 10, wherein said different curvature profile is based on a type of tooth.

12. The matrix band of claim 1, wherein the thickness of the central portion is at most equal to 0.0015 inches.

13. The matrix band of claim 1, wherein a relative placement of said central portion on said each wing of said two adjacent wings is different.

14. The matrix band of claim 1, wherein said area extending from said central portion to the upper edge of said each wing has a thickness equal to half the thickness of the central portion.

* * * * *